US006733132B2

United States Patent
Shevlin

(10) Patent No.: US 6,733,132 B2
(45) Date of Patent: *May 11, 2004

(54) DISPLAY DEVICE

(75) Inventor: Fergal Patrick Shevlin, Dublin (IE)

(73) Assignee: Shevlin Technologies Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 10/316,830

(22) Filed: Dec. 12, 2002

(65) Prior Publication Data

US 2003/0086062 A1 May 8, 2003

Related U.S. Application Data

(63) Continuation of application No. 10/172,003, filed on Jun. 17, 2002, now Pat. No. 6,517,206, which is a continuation of application No. PCT/IE00/00161, filed on Dec. 20, 2000.

(30) Foreign Application Priority Data

Dec. 23, 1999 (IE) .................................................. 991092
Apr. 19, 2000 (EP) .............................................. 00650036

(51) Int. Cl.[7] .................................................. A61B 3/02
(52) U.S. Cl. ........................................................ 351/243
(58) Field of Search ............................. 351/209, 210, 351/211, 212, 221, 239, 240, 243, 237; 356/512, 513, 515; 359/237, 242, 245, 630, 631; 606/4, 5; 353/100, 101; 349/56, 57, 61; 345/7, 8

(56) References Cited

U.S. PATENT DOCUMENTS

| 5,479,224 A | | 12/1995 | Yasugaki et al. ............ 353/101 |
| 5,701,132 A | | 12/1997 | Kollin et al. .................... 345/8 |
| 5,999,237 A | | 12/1999 | Miyawaki ..................... 349/57 |
| 6,002,484 A | * | 12/1999 | Rozema et al. .............. 356/354 |
| 6,191,892 B1 | * | 2/2001 | Isaka et al. .................. 359/630 |
| 6,323,984 B1 | * | 11/2001 | Trisnadi ...................... 359/245 |
| 6,394,999 B1 | * | 5/2002 | Williams et al. ................ 606/5 |
| 6,532,116 B1 | * | 3/2003 | Yamazaki .................... 359/631 |
| 6,603,443 B1 | * | 8/2003 | Hildebrand et al. ............ 345/8 |

FOREIGN PATENT DOCUMENTS

| GB | 2004563 A | 5/1979 |
| WO | WO99/08145 | 2/1999 |
| WO | WO00/28592 | 5/2000 |

OTHER PUBLICATIONS

Japanese Patent Abstracts JP3096913, Apr. 22, 1991.

* cited by examiner

Primary Examiner—George Manuel
(74) Attorney, Agent, or Firm—Jacobson Holman PLLC

(57) ABSTRACT

A display device (1) has a photon source (20) that displays an image scene in which the user perceives points at differents distances, resulting in optical stimulation of the eye's accommodative response. This is achieved by an intermediate optical system (21) forming the photons into pencils and a variable power optical system (22) positioned for convergence of the pencils. A control system (8) controls the variable power optical system (22) to modulate photon wavefront curvature according to image pixel co-ordinate and intensity data and data representing required perceived pixel distance.

12 Claims, 2 Drawing Sheets

DISPLAY DEVICE

This is a Continuation of application Ser. No. 10/172,003 filed Jun. 17, 2002, which in turn is Continuation of PCT/IE00/0061 filed Dec. 20, 2000.

FIELD OF THE INVENTION

The invention relates to a display device comprising:

a photon source for emitting photons for a source image; the source comprising a plurality of pixels arranged in a surface;

an intermediate optical system for direction of the emitted photons;

a variable power optical system for modulating photon wavefront curvature from the intermediate optical system; and a final optical system for directing photons from the variable power optical system into a user's eye for viewing the source image with a perception of a changing image scene.

PRIOR ART DISCUSSION

PCT Patent Specification No. WO99/08145 (Isis Innovation) describes such a display device. Such display devices operate to present source images to a user's eyes so that the user has the perception of each source image pixel at any one of a continuum of distances. Applications of such a display device include investigation of the eye's accommodative response and stereoscopic image display without conflict between accommodation and vergence.

A significant problem with optical systems for modulating photon wavefront curvature is due to the frequency and amplitude of optical element motion required. A display resolution of 1024×768 pixels refreshed (non-interlaced) at 60 Hz could require wavefront curvature to change at over 47 MHz. Mechanisms to translate or rotate optical elements at such frequencies by non-trivial amplitudes are bulky, expensive, and unreliable.

Optical systems exist which circumvent the problem of high-frequency translation and rotation. For example, they allow high-frequency deformation of reflective surfaces or high-frequency variation of the index of refraction of refractive surfaces. However there are other problems associated with these at present, including: their switching speeds are slow—of the order of kHz; they have relatively small diameters; their modes of wavefront deformation are limited; they have limited optical power; and they can have poor photon transmission.

Another problem relates to characteristics of pixels and their wavefronts. In order to realise many applications, some of which have been mentioned, the display should be capable of stimulating optically the eye's accommodative system. This requires not only appropriate wavefront curvature, but also a sufficiency of photons at appropriate wavelengths and a sufficient diameter of exit pupil for each pixel.

Another problem is the aberration introduced by the optical system, especially if a wide field of view of the photon sources is required. A "wide angle" lens system can be used to reduce aberration across the field for a single, but not necessarily multiple, configurations of the device. A conventional "zoom" lens system of varying optical power can be used to reduce aberrations for multiple configurations, but increases the mass of optical elements to be moved. A related problem is the overall mass of more complex systems, particularly if the device is to be used as a head-mounted display.

Display devices have been proposed which use the aforementioned non-rotating and non-translating optical systems to modulate wavefront curvature. However they do not overcome the problems outlined (especially the limitations of switching speed and diameter) in a practical, reliable, and cost-efficient manner, in order to simulate a wide field of view, high-resolution colour scene, with low aberration, in such a way as to stimulate optically the user's accommodative system.

SUMMARY OF THE INVENTION

According to the invention, there is a display device comprising:

a photon source for emitting photons for a source image, the source comprising a plurality of pixels arranged in a surface;

an intermediate optical system for direction of the emitted photons;

a variable power optical system for modulating wavefront curvature of photons from the intermediate optical system; and a final optical system for directing photons from the variable power optical system into a user's eye for viewing the source image with a perception of a changing image scene;

characterised in that the intermediate optical system comprises means for forming the photons into pencils, each pencil having photons from a single source pixel;

the variable power optical system is positioned with respect to the intermediate optical system such that the pencils converge towards one another;

the device further comprises a controller comprising means for receiving source image pixel co-ordinate data and intensity data, and data representing required perceived pixel distance, and for generating an output control signal for the variable power optical system, and an output control signal for the photon source, and the variable power optical system comprises means for dynamically altering the wavefront curvature of the pencils in response to the control signal.

In one embodiment, the controller comprises means for presenting simultaneously all pixels that can be displayed with acceptable levels of aberration for a given state of the variable power optical system.

In another embodiment, the controller comprises means for ordering the sequence of pixel presentation such that the magnitude of variable power optical system state change is minimised.

In another embodiment, the intermediate optical system comprises a variable diameter aperture with two translational degrees of freedom, controlled by the controller.

In a further embodiment, the final optical system comprises a concave mirror.

In one embodiment, at least part of the intermediate optical system is positioned after the variable power optical system to direct the pencils to be parallel such that it is telecentric.

In another embodiment, the intermediate optical system has a wide field of view of the photon source, encompassing an area wider than its physical size.

In one embodiment, the controller comprises means for receiving inputs from an eye-tracking system for monitoring the look direction and accommodative state of the user, and for using said inputs when generating the control signal.

In another embodiment, the controller comprises means for receiving inputs from the scene synthesis system for estimating the look direction and accommodative state of the user, and for using said inputs when generating the control signal.

In one embodiment, the controller comprises means for receiving inputs from a wavefront sensor for monitoring the output of the variable power optical system, and for using said inputs when generating the control signal.

DETAILED DESCRIPTION OF THE INVENTION

BRIEF DESCRIPTION OF THE DRAWINGS

The invention will be more clearly understood from the following description of some embodiments thereof, given by way of example only with reference to the accompanying drawings in which:—

DESCRIPTION OF THE EMBODIMENTS

Figure 1:
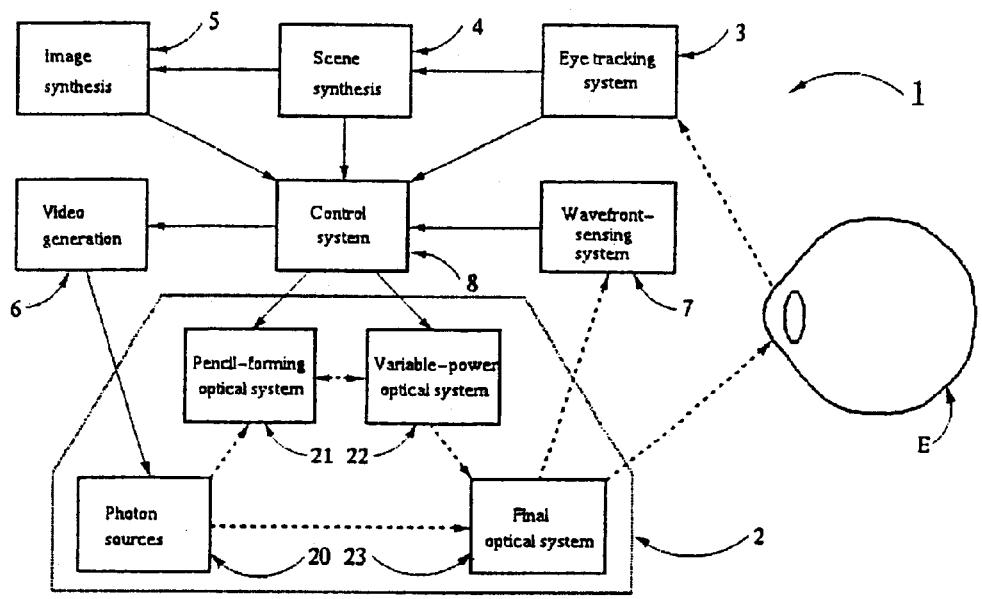
FIG. 1 is a systems-level schematic of a display device of the invention comprising eye-tracking, wavefront-sensing, scene synthesis, image synthesis, and video generation systems connected to an optical system.

Referring to FIG. 1 a display device 1 comprises the following data processing components and an optical system 2:

- an eye tracking system 3,
- a scene synthesis system 4,
- an image synthesis system 5,
- a video generation system 6, and
- a wavefront sensing system 7.

These interface with a control system 8, which in turn interfaces with components of the optical system 2 comprising:—

- a photon source 20, having multiple pixels in a 2D surface,
- an intermediate optical system, in this embodiment a pencil-forming system 21 which forms the photons into pencils, each pencil having photons from a single pixel, and
- a variable power optical system 22 towards which pencils converge, and
- a final optical system 23 for directing photons into a user's eye E for viewing the source image.

The photon source 20 comprises a conventional cathode-ray tube. The pixels emit photons in near-spherical wavefronts when excited by an electron beam scanned in a raster fashion via electromagnetic control.

The pencil-forming (intermediate) optical system 21 comprises an objective subsystem 21($a$) and an imaging sub-system 21($b$), both of which are achromatic doublets, one on either side of the variable power optical system 22. The objective sub-system 21($a$) is positioned such that its first principal focus lies at the surface of the photon source 20.

Aperture-limiting stops 24 of variable diameter and two degrees of translational freedom are positioned before the pencil-forming optical system 21. The stops 24 comprise a liquid-crystal optical system, with pixels controllable to be either transparent or opaque. This controls the number, positions, and diameters of pencils passing through the pencil-forming optical system 21.

Figure 3:
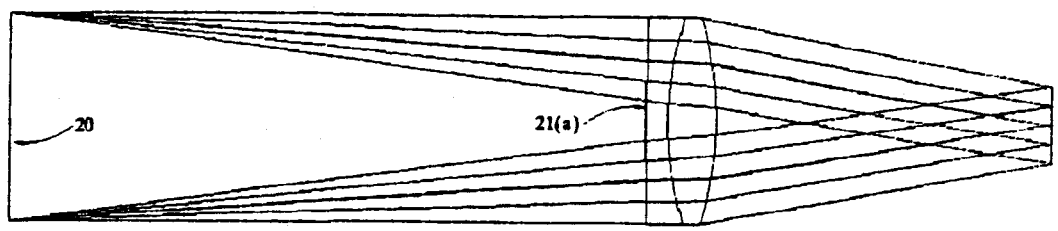
FIG. 3 is an optical schematic of pencils from two different pixels in the photon source, converging towards, and filling, an aperture-limiting stop.

The variable power optical system 22 is positioned a distance $d_v$ before the second principal focus of the objective sub-system 21($a$) such that pencils are convergent towards it and fill its entrance pupil, as shown in FIG. 3. Distance $d_v$ is calculated as follows, $$d_v = c s d_{vo}/(s d_o/f_o).$$

where $f_o$ and $sd_o$ are the focal length and semi-diameter respectively of the objective sub-system 21($a$), $sd_{vo}$ is the semi-diameter of the variable power optical system 22 with respect to the optical axis of the objective sub-system 21($a$), $sd_s$ is the maximum semi-diameter of the photon source 20, $d_o$ is the distance from the photon source 20 to the objective sub-system 21($a$), and c is a function of $(sd_s/d_o)$.

The variable power optical system 22 comprises a micro-machined deformable mirror (MMDM). It is a reflective-coated elastic membrane under tension. With no force applied the membrane is planar. An electrostatic force, applied via a set of actuators spatially distributed behind the membrane, deforms it into a variety of concave shapes or modes. The variable power optical system 22 is not simply one of variable focal length, it can achieve complex deformation of wavefront curvature which allows it to correct many kinds of aberration introduced by other optical systems of the device. The angles between the optical axis of the variable power optical system 22 and the optical axes of the objective, sub-system 21($a$) and the imaging sub-system 21($b$) are minimised to reduce astigmatic aberration introduced by the tilt of the variable power optical system 22. Since it is positioned where pencils converge towards it and diverge after it, a variable power optical system 22 with relatively small diameter does not necessarily limit the field of view in the object and imaging spaces of the pencil-forming optical system 21.

The imaging sub-system 21($b$) has positive optical power and brings pencils to points of focus before the final optical system 23. It is positioned a distance $(f_i-d_i)$ after the variable power optical system 22. Distance $d_i$ is calculated as follows, where $sd_i$ and $f_i$ are the semi-diameter and focal length respectively of the imaging sub-system 21($b$), and $sd_{vi}$ is the semi-diameter of the variable power optical system 22 measured with respect to the optical axis of imaging sub-system 21($b$):

$$d_i = s d_{vi}/(s d_i/f_i).$$

This makes the imaging sub-system 21($b$) near-telecentric so that irradiance and angular size of field are not changed significantly by the variable power optical system 22.

The final optical system 23 comprises a conventional low-aberration wide field-of-view eyepiece, as used in microscopes, telescopes, and other viewing instruments. It provides a Newtonian view (where light passes through most of the eye's entrance pupil) of the image. The final optical system 23 is positioned such its first principal focus lies at the surface of pencil focus, formed by the imaging sub-system 21($b$), when the variable power optical system 22 is in a state of maximum power. This causes pencils exiting the final optical system 23 to have near-planar wavefronts and so corresponding image pixels are perceived by the user to be at near-infinite distances. When the variable power optical system 22 is in a state of minimum power, the surface of pencil focus formed by the imaging sub-system 21(b) lies after the first principal focus of final optical system 23. This causes pencils exiting the final optical system 23 to have near-spherical wavefronts of high curvature and so corresponding image pixels are perceived by the user to be at small distances.

The control system 8 has inputs of pixel co-ordinates and intensities from the image synthesis system 5 and required perceived distance from the scene synthesis system 4. It generates an output to the video generation system 6 of pixels to display simultaneously, an output to the variable aperture-limiting stop 24 of the position and diameter of pencils to form, and an output to control the variable power optical system 22 to modulate pencil wavefront curvature.

Using look-direction and accommodative state inputs from an eye-tracking system 3, the control system 8 identifies and outputs with least aberration those pixels that are being observed by the user. Using scene synthesis system 4 inputs, the control system 8 identifies and outputs with reduced aberration those pixels that are most-likely being observed by the user.

Since switching and stabilising periods of the MMDM membrane of the variable power optical system 22 are proportional to the magnitude of shape change, the control system 8 orders the sequence of pixel output such that the total shape change required for each image has minimum magnitude.

A pre-calculated table of aberration values for all pixels at a variety of distances and for a variety of variable power optical system 22 states is used by the control system 8. Using the table to avoid run-time calculation, and estimating values through interpolation if necessary, the control system 8 identifies and outputs simultaneously all pixels that can be displayed with acceptable levels of aberration given the state of the variable power optical system 22.

A pre-calculated table of variable aperture-limiting stop 24 control signal values for all pixels at a variety of distances and for a variety of variable power optical system 22 states is also used by the control system 8. Using the table to avoid run-time calculation, and estimating values through interpolation if necessary, the control system 8 outputs variable aperture-limiting stop 24 control signals.

A pre-calculated table of a variety of variable power optical system 22 control signal values is available to the control system 8. Using the table to avoid run-time calculation, and estimating values through interpolation if necessary, the control system 8 outputs variable power optical system 22 control signals. The table values are subsequently modified by the control system 8 if inputs from a wavefront-sensing system 7 indicate that they fail to achieve the required wavefront curvatures.

Alternative embodiments of the invention 1 include the following:

The photon source 20 can comprise a variety of video display technologies that form a surface of image pixels by emission or reflection of photons with near-spherical wavefronts, including: liquid crystal, plasma, light-emitting diode, and digital micro-mirror devices. The photon source 20 can also comprise a single source of photons with near-planar wavefronts raster-scanned—by mirrors under micro-electro-mechanical system control—through an array of optical elements with the appropriate refractive, diffractive, or diffusive characteristics such that pixels with near-spherical wavefronts are formed.

Not all photons entering the eye need pass through all elements of the optical system 2. Beam-splitters and other refractive or reflective elements may be used to direct photons along alternative optical paths. These photons may originate at a single or multiple photon sources 20. In this case the controller 8 identifies and outputs the appropriate optical path for each image pixel.

The objective 21(a) and imaging 21(b) sub-systems can comprise complex optical systems to minimise aberration over wide fields of view.

Figure 2:
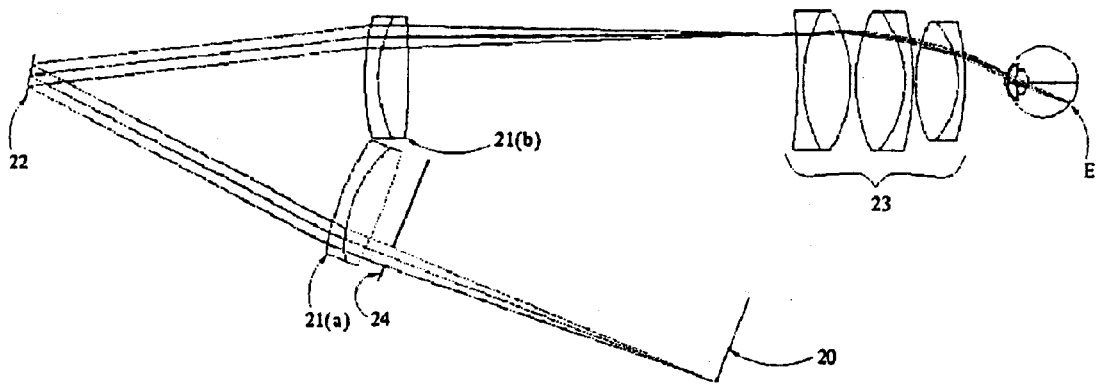
FIG. 2 is an optical schematic of the display device.

Multiple variable power optical systems 22 may exist at a variety of positions along the optical path. The variable power optical system 22 can comprise a deformable reflective surface under piezo-electric, pneumatic, or mechanical control. The variable power optical system 22 can comprise an optical system with dynamically controllable indices of refraction across its surface. This facilitates selective spatial retardation and so control of wavefront shape. Electro-optic, acousto-optic, photo-optic and other "solid-state" materials can be used. Such variable power optical systems 22 are positioned as shown in FIG. 2, but since they are not reflective they do not fold the optical path.

Figure 4:
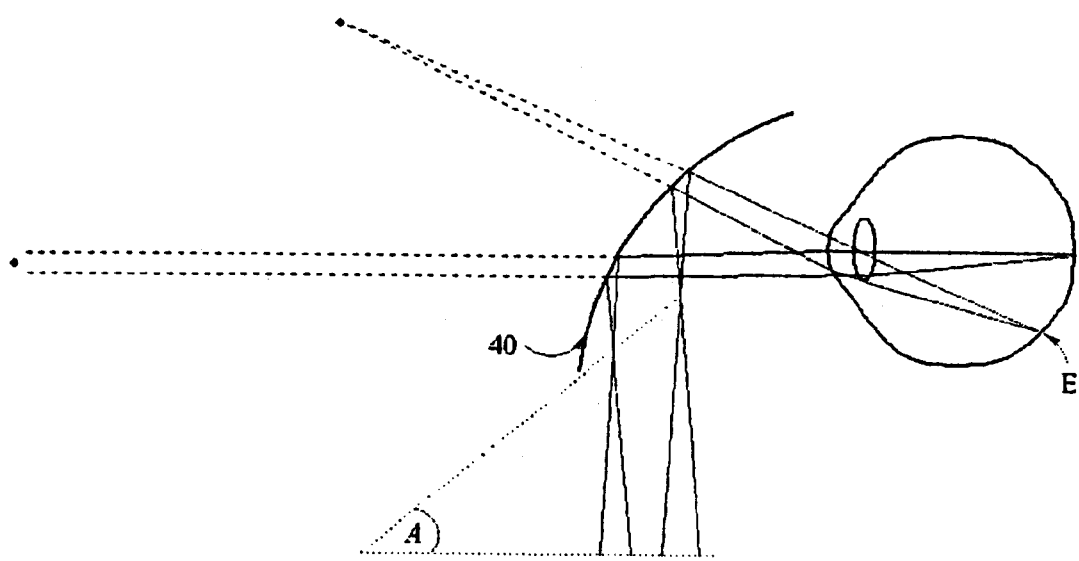
FIG. 4 is an optical schematic of the final optical system according to another embodiment of the invention, in which perceived locations of image points are represented.

The imaging sub-system 21(b) and the final optical system 23 can be integrated such that a real image surface is not necessarily formed. The final optical system 23 can comprise an off-axis concave mirror, as illustrated in a final optical system 40 in FIG. 4. The axis of the concave mirror and the real image surface may be tilted significantly with respect to one-another, see angle A. Tilt is achieved by additional reflective or refractive elements between the image surface and the mirror, or by appropriately tilting the elements of the pencil-forming optical system 21.

Advantages of the invention include: the ability to stimulate accommodation optically through provision of sufficient photons at appropriate wavelengths, with appropriate wavefront curvature, and with a sufficiently large exit pupil; the large exit pupil also facilitates alignment of the eye with the display; the variable power optical system 22 corrects aberration introduced by other optical systems of the device, meaning that less complex optics are required in the other systems; the objective sub-system 21(a) with wide field of view of the photon source 20 allows perception of high-resolution imagery without exceptionally small and densely-packed photon source elements; the telecentric imaging sub-system 21(b) allows change of depth without change of irradiance or angular size of field; the positioning of the variable power optical system 22 does not limit fields of view with its relatively small diameter; the control system 8 compensates for the limited switching-speed of the variable power optical system 22, allowing high-resolution imagery to be presented at conventional video rates.

The invention is not limited to the embodiments described but may be varied in construction and detail.

What is claimed is:

1. A display device comprising:
   a photon source for emitting photons for a source image, the source image comprising a plurality of pixels arranged in a surface;
   a variable power optical system for modulating wavefront curvature of photons; and
   a final optical system for directing photons from the variable power optical system into a user's eye so that the user has a perception of each source image pixel at any one of a continuum of distances;
   characterised in that
      the device comprises an aperture stop for forming the photons into pencils, each pencil having photons from a single source pixel;
      the device further comprises a controller comprising means for receiving source image pixel co-ordinate data and intensity data and data representing required perceived pixel distance, and for generating an output control signal for the variable power optical system, and an output control signal for the photon source; and the variable power optical system comprises means for dynamically altering the wavefront curvature of the pencils in response to the control signal.

2. The display device as claimed in claim 1, wherein the controller comprises means for presenting simultaneously all pixels that can be displayed with acceptable levels of aberration for a given state of the variable power optical system.

3. The display device as claimed in claim 1, wherein the device comprises an intermediate optical system comprising the aperture stop, at least part of the intermediate optical system being located in an optical path between the photon source and the variable power optical system.

4. The display device as claimed in claim 1, wherein the device comprises an intermediate optical system comprising the aperture stop, at least part of the intermediate optical system being integrated with the final optical system.

5. The display device as claimed in claim 1, wherein the controller comprises means for ordering the sequence of pixel presentation such that the magnitude of variable power optical system change is minimised.

6. The display device as claimed in claim 1, wherein the device comprises an intermediate optical system comprising the aperture stop, at least part of the intermediate optical system being located in an optical path between the photon source and the variable power optical system; and wherein at least part of the intermediate optical system is positioned after the variable power optical system to direct the pencils to be parallel such that the intermediate optical system is telecentric.

7. The display device as claimed in claim 1, wherein the controller comprises means for receiving inputs from an eye-tracking system for monitoring the look direction and/or accommodative state of the user, and for using said inputs when generating the control signal.

8. The display device as claimed in claim 1, wherein the device comprises an intermediate optical system comprising the aperture stop, at least part of the intermediate optical system being located in an optical path between the photon source and the variable power optical system; and the intermediate optical system comprises a variable diameter aperture with two translational degrees of freedom, controlled by the controller.

9. The display device as claimed in claim 1, wherein the device comprises an intermediate optical system comprising the aperture stop, at least part of the intermediate optical system being located in an optical path between the photon source and the variable power optical system; and wherein the intermediate optical system has a wide field of view of the photon source, encompassing an area wider than its physical size.

10. The display device as claimed in claim 1, wherein the final optical system comprises a concave mirror.

11. The display device as claimed in claim 1, wherein the controller comprises means for receiving inputs from a scene synthesis system for estimating the look direction and/or accommodative state of the user, and for using said inputs when generating the control signal.

12. The display device as claimed in claim 1, wherein the controller comprises means for receiving inputs from a wavefront sensor for monitoring the output of the variable power optical system, and for using said inputs when generating the control signal.

* * * * *